3,239,413
WORM LURE COMPOSITION AND METHOD
John L. Chaney, Lake Geneva, Wis.
No Drawing. Filed Dec. 17, 1962, Ser. No. 244,945
7 Claims. (Cl. 167—48)

The invention disclosed and claimed in this application relates to compositions of matter and to methods of using such compositions of matter in the trapping of worms and similar creatures. In the specific embodiments disclosed in the application, the compositions are useful in the attraction or the forcing of worms to the surface of the ground so that they may be easily captured and used.

There are millions of people who like to fish and many of these fishermen use worms for bait. Heretofore, the usual way of obtaining worms for the bait was either by digging in the earth to expose the worms which were hiding beneath the surface or by buying the worms from someone who had dug for them.

I have discovered compositions of matter of a nature which, when poured on the earth, cause fishworms to come to the surface where they may easily be gathered, washed, confined and transported to the place where they will fulfill their predestined destiny of acting as bait for fish. This saves the back-breaking labor of digging into or spading or turning over large volumes of earth in search of the worms. Just as the worms are lure for the fish, my composition may be called a lure for the worms, although the worms seem to be repelled from it rather than attracted toward it.

One of the objects of my invention therefore is the provision of new and useful compositions of matter.

A more specific object of my invention is the provision of new compositions of matter useful either as a lure for worms or as a driving force for forcing the worms from the ground.

A further object of my invention is the provision of a new method of capturing worms for use as bait for fish.

Further objects, features and advantages of my invention will be apparent from the following description and the appended claims.

My new compositions of matter consist essentially of (1) a chlorine compound, stable against release of chlorine when dry, but effective in the presence of water to release chlorine, (2) a wetting agent, and (3) a filler.

As the chlorine compound, I have discovered that potassium dichloro-isocyanurate is excellent in this composition. It is stable over long periods of time when dry, but nevertheless is effective to produce chlorine quickly when mixed in solution in proper proportion. Other chlorine producing compounds will undoubtedly be effective to drive the worms from the ground and many of these will occur to the skilled chemist.

It is critical, however, that a sufficient quantity of such chlorine producing compound be used and it is also critical that these be not too great a quantity of such compound. I have found that I must have my chlorine producing compound present in at least 4.5% by weight of the dry composition in order to be effective in driving or luring the worms from the ground. I have found also that if I have more than 18% of my chlorine producing compound by weight of the dry composition that the worms in the area will be killed by it either in the ground or on top of it.

As the wetting agent, any compound which reduces surface tension when dissolved in water or in water solutions is usable. The wetting agent allows the solution in the water to penetrate deeper into the ground and bring the worms up even if they are unusually deep in the ground. It promotes good saturation. I may use soaps, detergents, etc. However, organic derivatives such as sodium salts of high molecular weight alkyl sulfates or sulfonates are preferred, as for example, polymerized alkyl aryl sulfonates and monosulfates are suggested. I prefer alkyl aryl sulfonate because I have found in connection with my preferred mixture it causes the immediate solution of the dry mixture when poured into water and stirred for less than a minute whether the water is hot or cold and even when the water is near to the freezing point. Aluminum magnesium and calcium soaps are usable. For further example, I suggest the sulfonate condensation product of hydroxydiphenol alcohol or the condensation product of hydroxyphenol alcohol. Any competent chemist can suggest many other wetting agents or surface tension agents which will be effective in varying degrees.

The wetting agent may also facilitate the dispersion and/or solution of the dry materials in the water quickly and/or maintain the chlorine compound and other components in a dispersed and/or dissolved condition while it is penetrating into the ground. I have usually used alkyl aryl sulfonate as the wetting agent. From 1 to 5% by weight of the wetting agent is satisfactory depending on the agent. I have found 2.5% by weight of alkyl aryl sulfonate ideal in my composition.

Fillers or inert materials or bulking agents may be of various kinds: most sodium sulfates and phosphates are usable; sodium sulfate, sodium tripolyphosphate and trisodium phosphate are, of course, satisfactory. The kind of inert material is, of course, not important inasmuch as its main function is to dilute the amount of active material and to prevent the compound from being harmful to worms and animals and plants. Some material which acts as a fertilizer for plants is desirable in order to prevent the composition of matter from having an apparent undesirable effect upon vegetation. Sodium tripolyphosphate and tri-sodium phosphate are useful in this connection.

A specific example of a composition of matter which I have used effectively consists of 8% potassium dichloro-isocyanurate, 2.5% substantially pure alkyl aryl sulfonate, 21% anhydrous sodium tripolyphosphate, 4.25% silicate of soda, less than 1% of dye, for the related anhydrous sodium sulfate.

In the above example, the potassium dichloro-isocyanurate is the chlorine producing compound; the alkyl aryl sulfonate is the wetting agent; the sodium tripolyphosphate is considered as the fertilizer or nutrient; the silicate of soda is a binder or filler; the dye is to give a pleasing color to the dry mixture; and the sodium sulfate is a filler. Thus there is from 4.5 to 18% of the chlorine compound, from 1 to 5% of the wetting agent; less than 30% of the fertilizer or nutrient; and at least 60% of filler, all of which are my preferred percentages.

In the use of my compositions I mix the essential or active ingredients and the filler, I then pour the dry mixture in water in a proportion of about one-half ounce of the mixture to about two and a half gallons of water. The mixture is then stirred in the water thoroughly for about one-half minute. I then pour the solution on the ground in which the worms are present. In less than a minute, large numbers of worms and night crawlers come out of the ground and may be easily picked up, rinsed in fresh water, and put in the worm container. The rinsing step is highly desirable and may be necessary (with the higher percent of chlorine release agents) to prevent the chlorine from killing the worms. Any water is suitable and the temperature is not important. The mixture should be poured on the soil at the rate of about two and a half gallons of water to an area of soil approximately one yard square. The most likely place to find worms in in rich moist soil, preferably in the shade.

Best results are obtained if the soil is moistened thoroughly before using the lure composition of this invention. Any water is suitable for this. After moistening the soil, the user should wait about 15 minutes and sprinkle all of the two and a half gallons on the same area.

It is to be understood that the above described embodiments of my invention are for the purpose of illustration only and various changes may be made therein without departing from the spirit and scope of my invention as defined by the appended claims.

I claim:

1. A composition of matter consisting essentially of about 8% potassium dichloro-isocyanurate, about 2.5% of an alkyl aryl sulfonate, about 21% anhydrous sodium tripolyphosphate, about 4.25% of silicate of soda, all percentages being by weight and the remainder anhydrous sodium sulfate.

2. A composition of matter comprising potassium dichloro-isocyanurate, a wetting agent, a plant nutrient and a filler in which the chlorine compound is present in an amount of from about 4.5 to about 18%, the wetting agent is present in an amount of from about 1 to about 5%, the nutrient is present in an amount up to about 30%, and the remainder is essentially the filler.

3. A composition of matter consisting of a solution in water of a mixture by weight of about 8% potassium dichloro-isocyanurate, about 2.5% substantially pure alkyl aryl sulfonate, about 21% of anhydrous sodium tripolyphosphate, about 4.25% of silicate of soda, less than 1% of dye, and about 64% anhydrous sodium sulfate, the solution including the mixture in a ratio equivalent to about one-half ounce of the mixture to about two and a half gallons of water.

4. A composition of matter consisting essentially of about 8% potassium dichloro-isocyanurate, about 2.5% of a substantially pure alkyl aryl sulfonate, about 21% anhydrous sodium tripolyphosphate, about 4.25% of silicate of soda, less than 1% of dye all percentages being by weight and the remainder of the composition being anhydrous sodium sulfate.

5. A method of procuring worms which comprises:
pouring a solution which consists of about one-half ounce of a mixture containing about 8% by weight of:
potassium dichloro-isocyanurate, a wetting agent selected from the group consisting of polymerized alkyl aryl sulfonates, monosulfates, aluminum magnesium soaps, aluminum calcium soaps, the sulfonate condensation product of hydroxy-diphenol alcohol, and the condensation product of hydroxyphenol alcohol and a major proportion of a filler selected from the group consisting of sodium sulfates, sodium phosphates, sodium tripolyphosphate and tri-sodium phosphate dissolved in about two and one-half gallons of water on the ground
in which worms are present, causing the worms to emerge from the ground;
collecting the worms; and
washing the worms.

6. A method of procuring worms for bait for fish which comprises:
pouring a solution which consists of about one-half ounce of a mixture containing potassium dichloro-isocyanurate dissolved in about two and one-half gallons of water on the ground in which worms are present to drive the worms to the surface;
picking up the worms; and
washing the worms to remove any remaining solution.

7. A method of procuring worms for bait for fish which comprises:
pouring a solution of about one-half ounce of a mixture containing from 4.5 to 18% of potassium dichloro-isocyanurate dissolved in about two and one-half gallons of water on the ground in which worms are present to drive the worms to the surface;
picking up the worms; and
washing the worms to remove any remaining solution.

References Cited by the Examiner

UNITED STATES PATENTS 1,446,914  2/1923  Lingafelter et al. _____ 167—13

FOREIGN PATENTS 219,930  11/1956  Australia.
607,971  11/1960  Canada.

JULIAN S. LEVITT, *Primary Examiner.*